United States Patent
Peddicord et al.

[11] Patent Number: 5,411,717
[45] Date of Patent: May 2, 1995

[54] SALT PLATFORM

[76] Inventors: Steven M. Peddicord, 5310 Rustle Leaf, Arlington, Tex. 76017; Donald B. Peddicord, 2811 Misty Cr., Durant, Okla. 74701

[21] Appl. No.: 188,141

[22] Filed: Jan. 27, 1994

Related U.S. Application Data

[63] Continuation-in-part of Ser. No. 888,869, May 27, 1992, abandoned.

[51] Int. Cl.$^6$ .............................................. B01D 15/00
[52] U.S. Cl. .................... 422/275; 422/261; 422/311; 210/190; 108/50; 108/90
[58] Field of Search ............... 422/261, 263, 265, 275, 422/311; 210/190, 191; 220/4.28, 529; 206/526; 248/676, 678; 108/50, 90, 150, 157; 135/96; 4/227.1, 490

[56] References Cited

U.S. PATENT DOCUMENTS

| | | | |
|---|---|---|---|
| 1,385,903 | 7/1921 | Cochran | 248/146 |
| 2,657,964 | 11/1953 | Watrous | 108/157 |
| 2,669,117 | 2/1954 | Fuhrmann | 211/148 |
| 2,829,934 | 4/1958 | Schulze | 108/157 |
| 3,374,891 | 3/1968 | Buchmann | 210/126 |
| 3,432,038 | 3/1969 | Heskett | 210/571 |
| 3,460,566 | 8/1969 | Heartstedt et al. | 137/571 |
| 3,502,442 | 3/1970 | Campbell et al. | 210/191 |
| 4,235,340 | 11/1980 | Clack et al. | 206/515 |
| 4,260,487 | 4/1981 | Gruett | 210/190 |
| 4,623,367 | 11/1986 | Paulson | 108/50 |
| 4,718,447 | 1/1988 | Marshall | 422/263 |
| 4,764,280 | 8/1988 | Brown et al. | 210/662 |
| 4,946,600 | 8/1990 | Shin | 210/758 |
| 5,310,488 | 5/1994 | Hansen et al. | 210/674 |

FOREIGN PATENT DOCUMENTS

64147 9/1892 Germany ........................... 108/157

Primary Examiner—Robert J. Warden
Assistant Examiner—T. A. Trembley
Attorney, Agent, or Firm—Richards, Medlock & Andrews

[57] ABSTRACT

A salt platform (10, 50, 80) is disclosed which can be used in an ion exchange water softener to support the salt used in the water softening process. The salt platform will be typically placed in a tank containing a salt brine which wets the grid (34) and the area above the grid containing the dry salt which is drawn into the brine as the salt is depleted during the process. The platform includes a plurality of vertically oriented members (12-24) which are preferably formed of PVC plastic pipe. Bracing members (26, 28) are secured between adjacent vertically oriented cylinders to provide a stable platform. A grid (34) is supported atop the vertically oriented cylinders and the salt, in turn, is supported on the grid.

19 Claims, 6 Drawing Sheets

SALT PLATFORM

This application is a continuation-in-part of U.S. patent application Ser. No. 07/888,869 filed on May 27, 1992, now abandoned.

TECHNICAL FIELD OF THE INVENTION

This invention relates to water softeners using salt, and in particular to a platform for supporting the salt.

BACKGROUND OF THE INVENTION

Water softeners find wide applications throughout society. In many applications, it is desirable to soften the water by removing the hardness minerals from the water before use. This is particularly critical in boiler operation where use of hard water will create boiler scale and rapidly reduce operating efficiencies.

A common water softening process is to use water softeners designed for this purpose. Water softening tanks contain cation exchange resin capable of exchanging hardness ions, i.e., calcium and magnesium for sodium ions which are very soluble.

When the hardness exchanging capacity of the water softening resin has exhausted it stops producing soft water. It then becomes necessary to regenerate the resin with a saturated solution of sodium or potassium chloride. Because of cost, sodium chloride is usually the chemical of choice.

Sodium chloride brine solution is made in a separate tank built and designed for this purpose, and this tank is called a brine tank.

Modern water softeners are well engineered and designed to produce soft water with all regeneration actions done automatically, including the transfer of the saturated brine from the brine tank to the water softener tanks.

In order for the water softener resin to be properly rejuvenated, the saturated brine solution must be of high quality and a measured volume must be delivered whenever needed.

A properly designed and engineered brine tank will provide these needs by delivering a measured quantity of saturated salt brine containing a fixed amount of dissolved salt per gallon of water.

This is accomplished by using a horizontal salt grid in a vertical tank. The height and diameter of the salt grid varies for each softening system, depending on many factors, but in all cases the height of the salt grid sets the volume of water in the brine tank.

In actual practice, the brine system is set to fill the brine tank with fresh water from the bottom of the tank to approximately 1" above the salt grid and then shut off.

Using this method, only 1" of water touches the vertical salt pile, which may be several hundred pounds in weight, stored on top of the salt grid.

This system is called a dry salt shelf system, as opposed to a wet salt brine tank system where most or all the salt is immersed in water. The dry salt shelf system has significant advantages over the wet salt system. The dry salt shelf method produces 100% saturated brine (specific gravity 1.2) all the time where wet salt methods do not. The dry salt shelf system affects more dry salt storage in the same size brine tank than a wet salt system. A dry salt shelf system is easier to keep clean than the wet salt system. A dry salt shelf system does not require a gravel support bed at the bottom of the brine tank. The dry salt shelf system offers lower maintenance costs to the operator, no gravel cleaning or replacement.

The dry salt shelf system has no messy brine float valves as used above the liquid brine on wet salt systems. These float valves become corroded with salt creep and require repair and/or replacement frequently. The dry salt shelf system uses brine float or refill valves in the lower section of the brine tank (below the shelf) and are less exposed to the risk of malfunctions or corrosion, thus operating more efficiently. The dry salt shelf system uses all of the salt stored before the brine tank needs to be refilled. Liquid below the shelf is saturated brine even if only one grain of salt remains on the shelf. The brine tank salt refill is less often with the dry salt shelf system because of the greater salt storage capacity it offers. Brine tank corrosion is reduced or eliminated on steel brine tanks with the dry salt shelf system because the liquid level is down below the dry salt, thus less air/brine exposure. The dry salt shelf system allows more programmed salt delivery scheduling because the salt stored is easily seen and thus the quantity remaining can be easily determined. The dry salt shelf system allows the use of all grades of salt, even the most economical rock type salt. The dry salt shelf type brine system can be cleaned in less than one hour, regardless of size whereas a wet salt tank may take one day and require the water softener to be down.

Dissolving of salt starts immediately and continues until the volume of water beneath the salt grid becomes saturated with dissolved salt. When saturation occurs, dissolving ceases. Stored salt above the salt grid not in contact with the water remains dry, preventing bridging and mushing.

Using a salt grid enables an engineer to calculate the quantity and quality of a particular size brine tank will produce. The engineer then is able to select the proper brine tank for the water softener system. It is imperative that the grid and support system be strong to support the mass of weight placed upon it. Until now, salt grids and support systems have usually been made from pegboard. It is readily available and cheap; however, in contact with the salt brine it tends to deform, warp and those portions of the salt grid left unsupported tend to break and collapse, dumping the salt stored on them down into the brine measuring area.

When this occurs, it causes the water softener to malfunction.

The salt grid and support system must be rebuilt, and in time it fails again.

For these reasons, the salt grid and support system could not be used in larger brine tanks.

As the demand increased for larger and larger water softeners, the demand for more saturated brine increased.

In order to provide this requirement, brine tanks increased in size and the pegboard salt grid and support system could not be used as they were not strong enough to hold the weight.

These larger systems were forced to use the less efficient older method of wet storage.

This method consists of loading the brine tank with several hundred pounds of gravel on the bottom. Several hundred pounds of salt is then poured upon the gravel and then adding water until a portion or all of the salt is submerged.

The measuring advantage of the salt grid system is lost.

The salt brine produced by the wet salt storage method is often of poor quality and submerged salt tends to bridge and mush, causing maintenance problems.

The salt grid plate and support system we have designed and built is strong enough that it may be used in the larger systems.

Again, the engineer can calculate the exact quantity of brine needed by utilizing the salt grid method.

SUMMARY OF THE INVENTION

In accordance with one aspect of the present invention, a salt platform is provided for supporting a load of salt in a water softener. The platform includes a plurality of vertically oriented members. At least one horizontal bracing member is secured between adjacent vertical oriented members to form a stable platform to support salt thereon. The vertically oriented members have a lower end and an upper end, the upper end of each of the vertically oriented members lying in a common plane. The members can be formed of PVC (Polyvinylchloride) plastic.

In accordance with another aspect of the present invention, a grid is set atop the upper ends of the vertical oriented members to support the salt. In another aspect, the vertically oriented members can be tubular. Each of the vertically oriented members can have a plurality of apertures formed therethrough to reduce buoyancy effects as the water softener is filled with water.

In accordance with another aspect of the present invention, the salt platform comprises a central vertically oriented member and six radial vertically oriented members, each of said radial vertically oriented members at equal radial distance from the center vertically oriented member. Any number of radial vertically oriented members can be used. In particular, more than six can be used to construct a larger support system.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

With reference now to the accompanying drawings, wherein like or corresponding parts are designated by the same reference numeral, and with specific reference to FIGS. 1-5, a salt platform 10 is disclosed which forms a first embodiment of the present invention. The platform will be positioned within a tank containing salt which forms part of a water softener. Frequently, the tank is a stand alone unit which contains only the salt and the platform. Water is then circulated through the tank where sodium chloride is dissolved to substitute for the minerals in the water.

The salt platform 10 can be seen to include a central vertically oriented cylinder 12 and a series of radial vertically oriented cylinders 14–24. Each of the radially oriented cylinders 14–24 attached to the central cylinder 12 by a pair of horizontal bracing members 26 and 28. In the preferred embodiment, the cylinders 14–24 and bracing members and 26 and 28 are formed of PVC plastic. The cylinder 12 can be 6 inches in diameter and the cylinders 14–24 4 inches in diameter. The bracing members are preferably glued to the cylinders with a commonly available PVC glue such as used in plumbing to join PVC pipe sections together.

The upper end 30 of each of the cylinders 14–24 can be seen to lie in a common plane 32. A grid 34 is preferably supported on the upper ends of each of the cylinders 14–24 which, in turn, is in direct contact with the salt supported by the platform 10. Preferably the grid 34 has a plurality of apertures 36 formed therethrough for easy passage of the water through the salt. In the preferred embodiment, the grid 34 is made out of ABS (acrylonitrile butadiene styrene) plastic and is one-quarter inch thick. The grid is cut to a diameter slightly less than the diameter of the tank in which the platform 10 is used. A sufficient number of apertures are then formed through the grid to provide the necessary path for water flow. The apertures can be approximately $\frac{1}{8}$ to $\frac{1}{2}$ inch in diameter and preferably $\frac{1}{8}$ inch or $\frac{1}{4}$ inch, for example. In one technique, a common sheet of perforated peg board can be laid on top of the grid 34, and used as a pattern to drill the holes through the grid 34. Clearly, the grid 34 can be molded with the holes 36 in place if this is more economical.

By using a plurality of vertically oriented cylinders 14–24, interconnected by bracing members 26 and 28, the load of salt is uniformly supported. It is common for water softeners to employ hundreds of pounds of salt and the platform 10 must be sufficiently strong to support this weight. Because a plurality of vertically oriented cylinders 14–24 are used, the invention works well regardless of the specific platform height or width that is used. In order to uniformly support the entire weight bearing surface of the salt grid, all of the area which is beneath the salt grid to the bottom of the tank and the sidewall to sidewall is used to support the grid 34 by suitable placement of the vertically oriented cylinders 14–24 and the horizontal bracing members 26 and 28. The salt platform 10 can be used in tanks having a diameter range of between 18" and 72", for example. Moreover, the tanks need not be cylindrical, but can have a square or other cross-section.

Each of the vertically oriented cylinders 14–24 has a series of holes 49 formed through the wall of the cylinders distributed along its length. These holes 49 allow water to fill the interior of the cylinders 14–24 relatively early in the filling of the tank so that the platform 10 will not lift or shift position due to buoyancy. Similarly, the holes 49 will permit water to drain from the cylinders as the tank is drained. The hole can be ½" diameter, for example.

With reference now to FIGS. 6–10, a second embodiment of the present invention is illustrated as salt platform 50. A number of elements of salt platform 50 are identical to that of salt platform 10 and are identified by the same reference numeral. However, in salt platform 50, a second set of radial vertically oriented cylinders 52–62 are distributed at uniform radial distances from the central cylinder 12. Bracing members 64 and 66 are used to secure each of the cylinders 52–62 to two of the adjacent radial cylinders 14–24.

Figure 1:
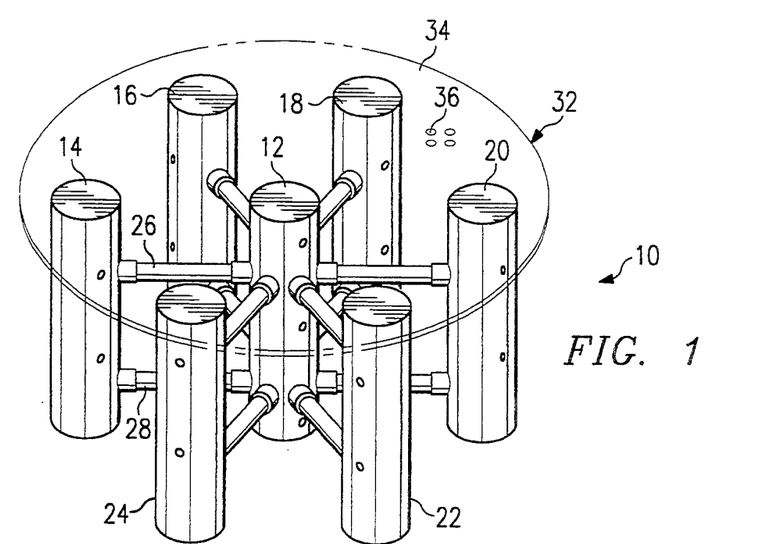
FIG. 1 is a perspective view of a salt platform forming a first embodiment of the present invention.
Figure 2:
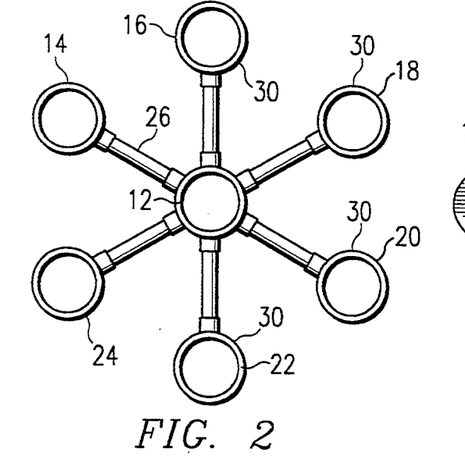
FIG. 2 is a top view of the salt platform.
Figure 3:
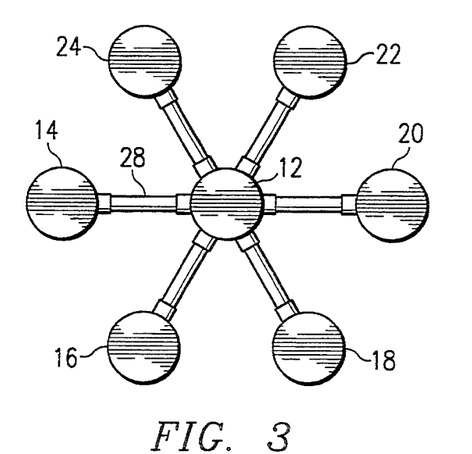
FIG. 3 is a bottom view of the salt platform.
Figure 4:
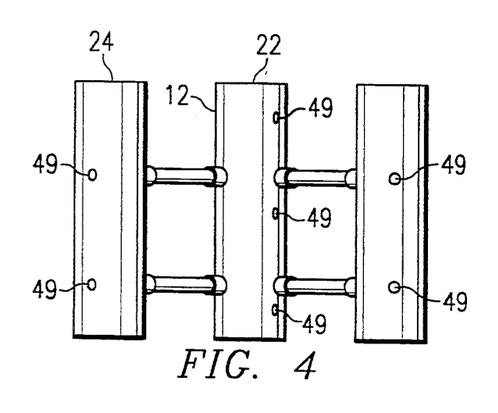
FIG. 4 is a side view of the salt platform.
Figure 5:
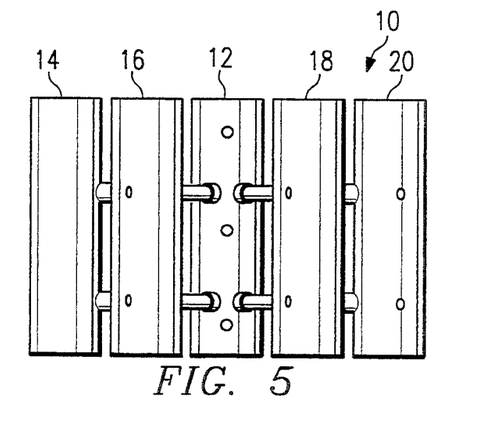
FIG. 5 is another side view of the salt platform taken from an angle different than FIG. 4.
Figure 6:
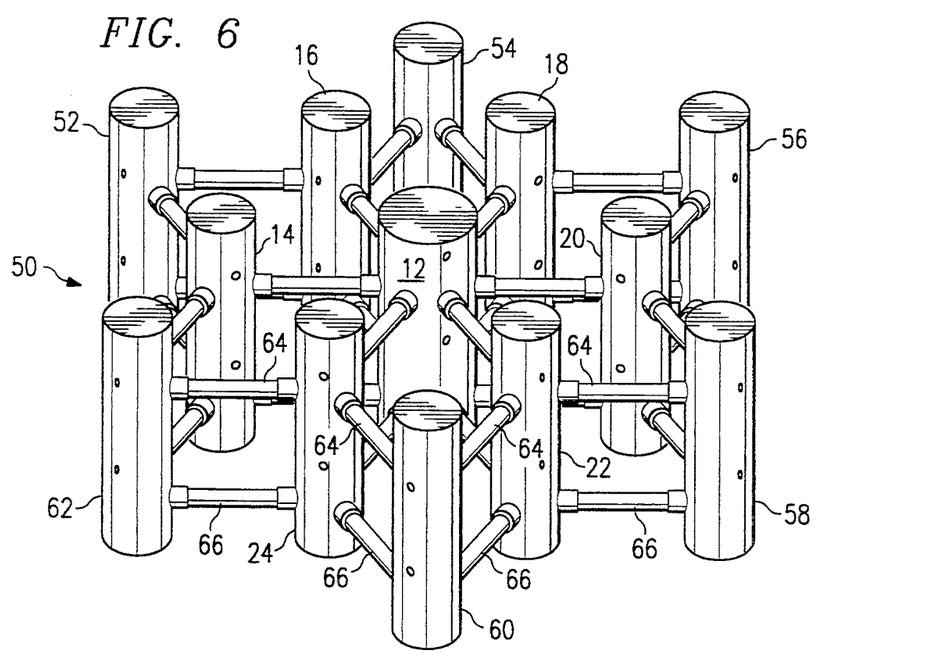
FIG. 6 is a perspective view of a salt platform forming a second embodiment of the present invention.
Figures 7, 11:
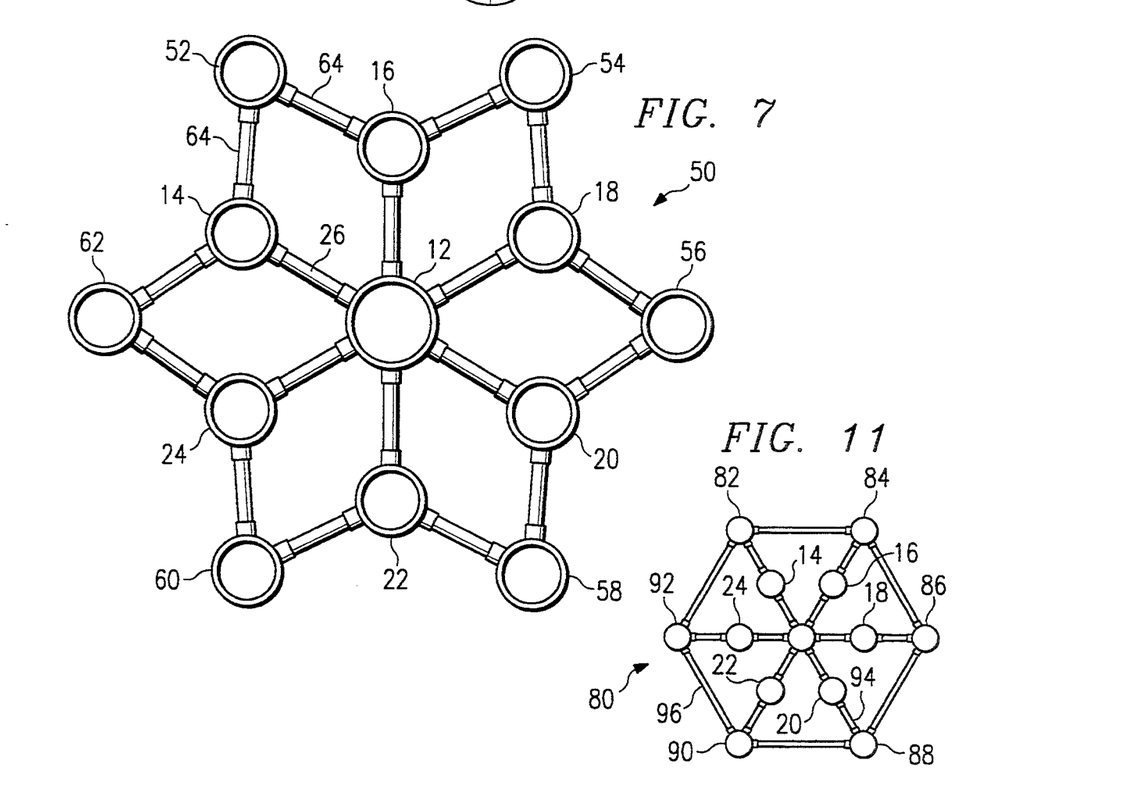
FIG. 7 is a top view of the salt platform of FIG. 6.
FIG. 11 is a schematic view of a third embodiment of the present invention.
Figure 8:
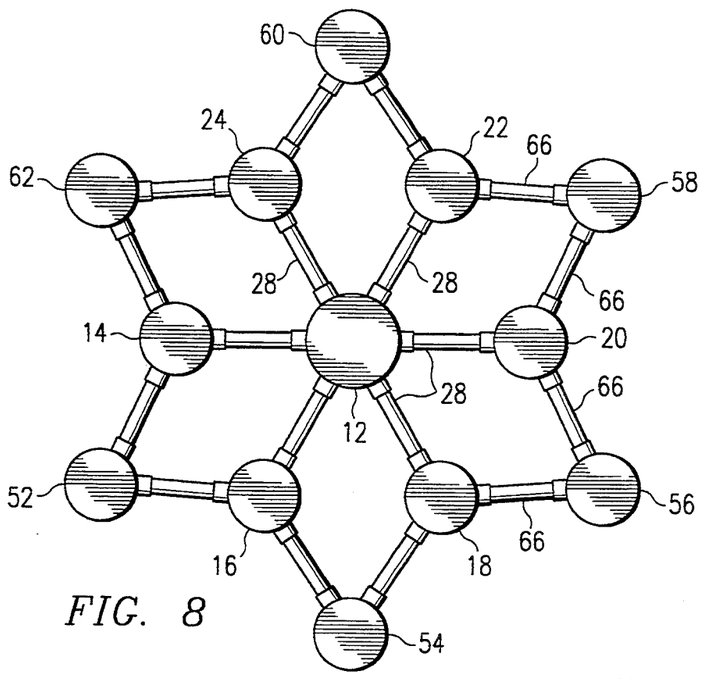
FIG. 8 is a bottom view of the salt platform of FIG. 6.
Figure 9:
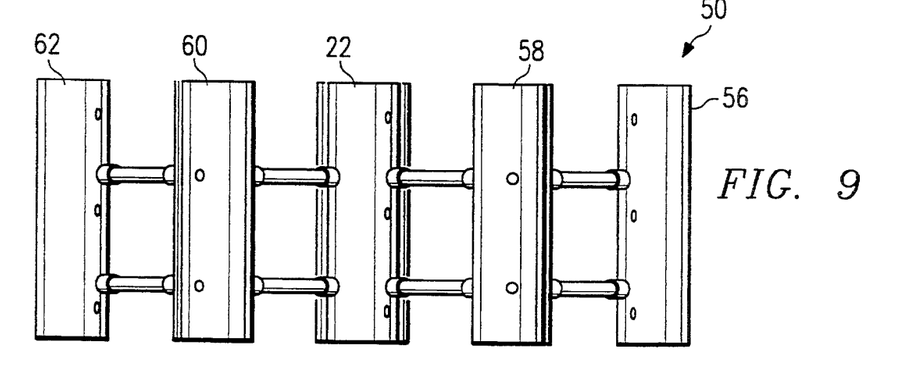
FIG. 9 is a side view of the salt platform of FIG. 6.
Figure 10:
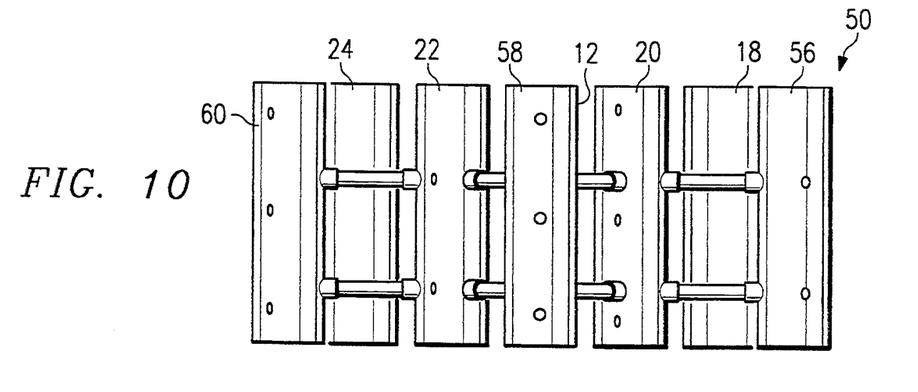
FIG. 10 is another side view of the salt platform of FIG. 6 taken from an angle different than FIG. 9.

With reference to FIG. 11, a third embodiment of the present invention is illustrated and forms salt platform 80. Again, a number of elements of salt platform 80 are identical to that of salt platform 10 and are identified by the same reference numeral. Salt platform 80 is provided with a second set of radial vertically oriented cylinders 82–92 which are spaced on the same radial lines as the cylinders 14–24. Each of the cylinders 82–92 are connected to adjacent cylinders by radial bracing members 94 and circumferential bracing members 96.

Figure 12:
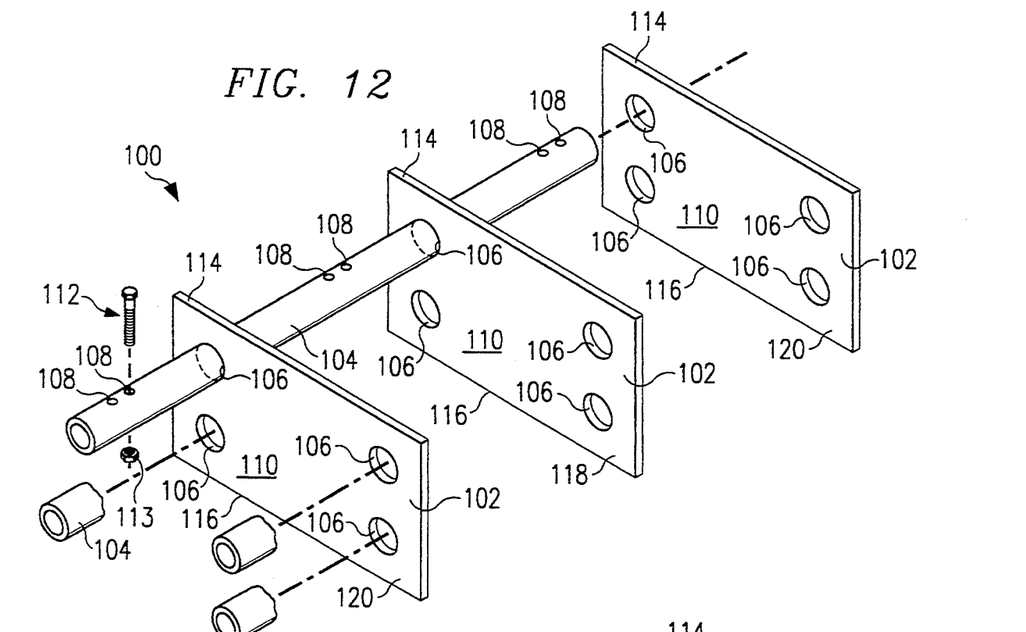
FIG. 12 is a perspective view of a fourth embodiment of the present invention.
Figure 13:
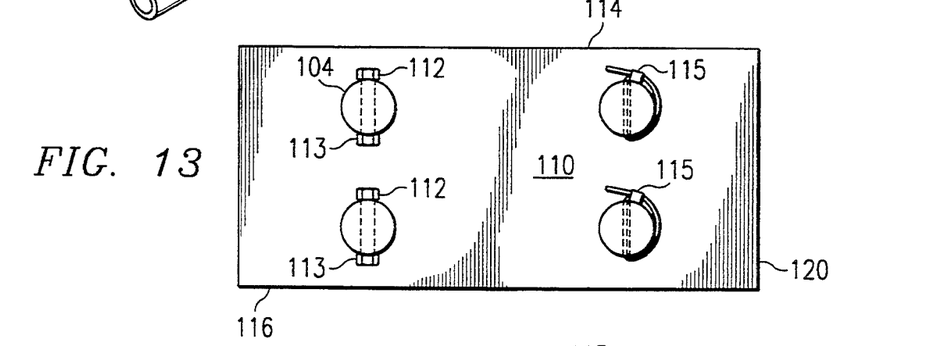
FIG. 13 is a side view of the embodiment of FIG. 12.
Figure 14:
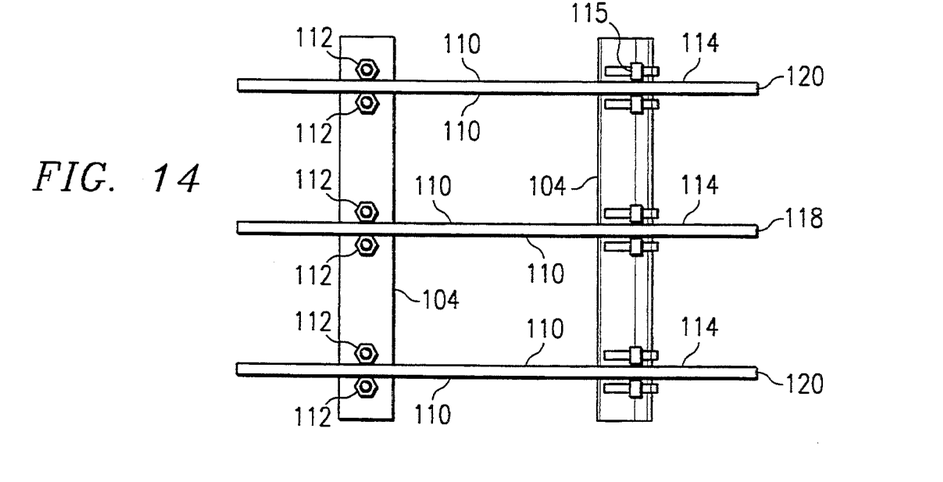
FIG. 14 is a top view of the embodiment of FIG. 12.

With reference now to FIGS. 12–14, a fourth embodiment of the present invention is illustrated as salt platform 100. Salt platform 100 can be seen to include a series of vertically oriented sheets 102, preferably formed of ABS plastic. The sheets are connected together in a spaced apart relation by a series of horizontal tubes 104, preferably formed of PVC pipe. The tubes 104 pass through suitably formed apertures 106 in the sheets. Holes 108 are formed through the tubes 104 immediately adjacent the surfaces 110 of the sheets to hold the platform 100 together. A bolt 112 or other suitable fastener can be passed through each of the holes 108 and secured therein, as by nut 113 so that the tube 104 is locked in place relative to the sheets 102. Alternatively, fasteners such as plastic wire ties 115 can be passed through the holes to act in a similar manner. Other suitable fasteners would include clips, pegs, pins, and the like.

The salt platform 100 is positioned within the water softener with the upper edges 114 of the sheets 102 supporting the salt platform 100. The lower edges 116 rest on the bottom of the water softener tank.

As can be understood, the sheets can be any suitable length to fit the particular tank used. For example, the middle sheet 118 may be longer than the end sheets 120 if the tank is circular. Further, the lower edges 116 of the sheets 102 can be curved in any desired configuration to better fit the contour of the water softener tank. Any number of sheets 102 can be placed side by side by simply lengthening the tubes 104 and providing suitable mounting holes adjacent the position of each sheet 102.

As can be readily understood, a key part of the invention is the ability to distribute the salt load through a plurality of vertically oriented members distributed relatively uniformly underneath the salt grid. The members need not be circular, however, PVC pipe is commonly available and is inexpensive and forms a very effective member for use in this application. The use of PVC and ABS plastic have the advantage of being very inert to brine and would be expected to have very long service life in this application. However, any other material can be used to form the platform and grid which are strong enough and inert to the brine solution. An example of suitable materials include, but is not limited to, acrylics, plexiglass, fiberglass, polyethylene, polypropylene, polycarbonate, NORYL®, KEVLAR® and metal structures made impervious to the brine solution by resin or asphalt type coatings.

Figure 15:
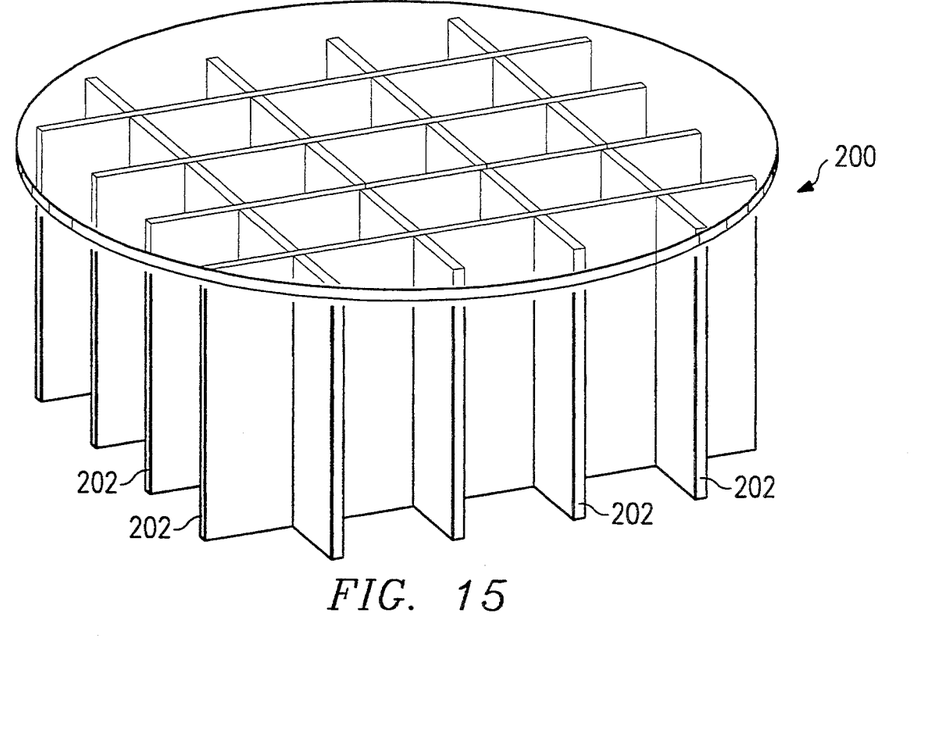
FIG. 15 is a perspective view of a fifth embodiment of the present invention with slotted sheets.
Figure 16:
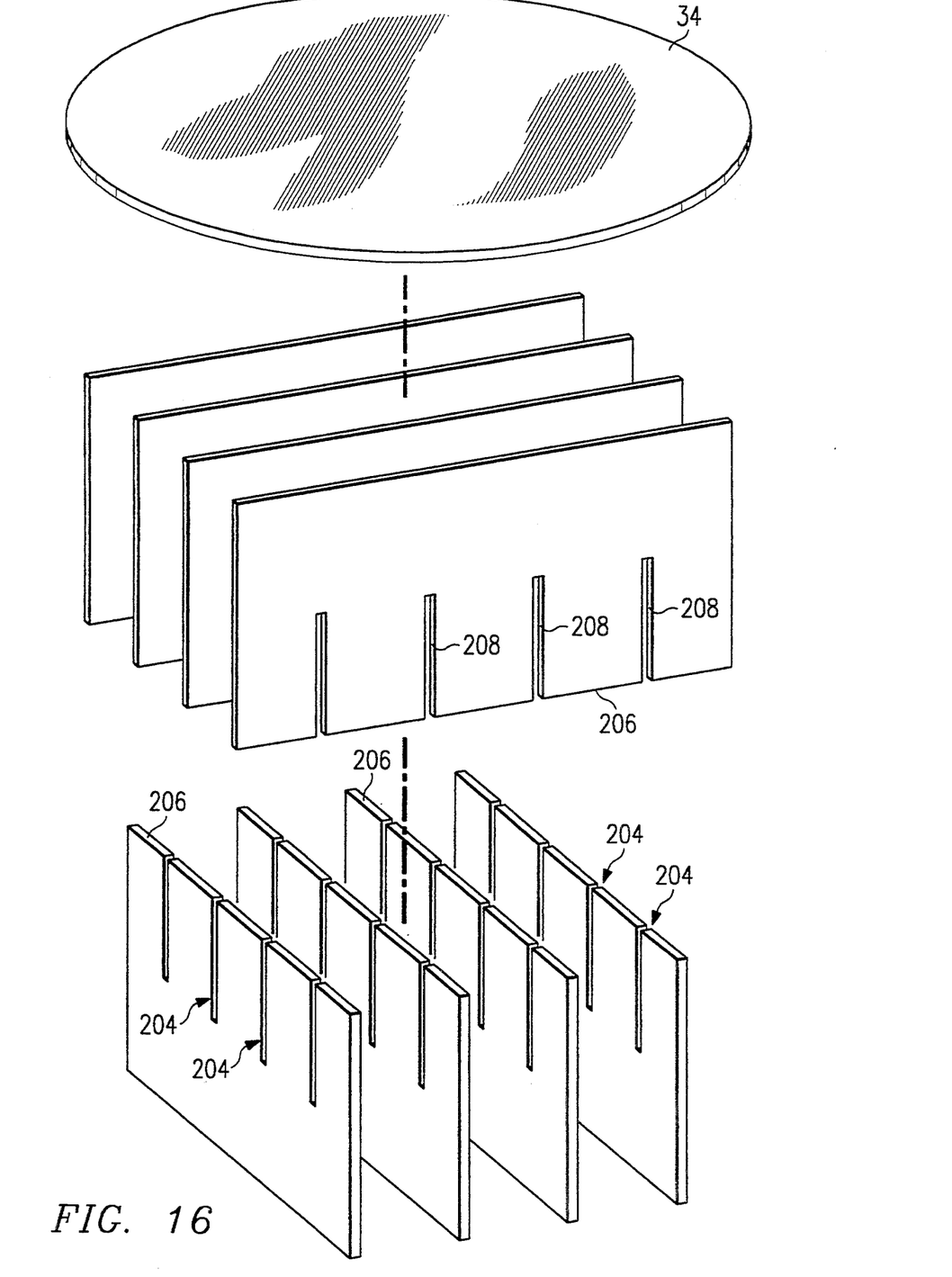
FIG. 16 is an exploded view of the embodiment of FIG. 15.

With reference now to FIGS. 15 and 16, a fifth embodiment of the present invention is illustrated as salt platform 200. Salt platform 200 can be seen to include a series of vertically oriented sheets 202, preferably formed of ABS plastic. Each sheet has a series of slots 204 formed into the sheet from one edge 206. As can be seen in FIG. 16, the sheets 202 can be mated to each other, with the slots 204 of one sheet mating with the slots of another sheet, to form a rigid, self-standing platform 200, as seen in FIG. 15. Preferably, the slots 204 extend somewhat over one-half of the way from edge 206 to the opposite edges so that, when the sheets 202 are mated, the top edges of the sheets 202 lie in the same plane to uniformly support the grid 34. Also, the bottom edges of the sheets 202 should lie in the same plane if the bottom of the tank is flat to uniformly distribute the load along the bottom of the tank.

While eight sheets 202 are shown in FIGS. 15 and 16, it is clear that any number of sheets 202 can be used. For example, two sheets can be interconnected to form a platform. Three sheets can be mated in a triangular form to form a platform and four or more sheets can be mated to form various configurations. As will be clearly understood, the edges 208 of the slots 204 engage the surface of the mating sheet to form a rigid construction without the use of any fasteners whatsoever.

Although several embodiments of the invention have been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

We claim:

1. A salt platform for supporting a load of salt in a water softener brine tank comprising:
    a plurality of vertically oriented members;
    at least one horizontal bracing member secured between adjacent vertically oriented members to form a stable platform to support salt thereon; and
    a salt grid supported on the plurality of vertically oriented members, salt being supported on the salt grid.

2. The salt platform of claim 1 wherein plurality of the vertically oriented members have a lower end and an upper end, the upper end of each of the vertically oriented members lying in a common plane.

3. The salt platform of claim 1 wherein each of the plurality of vertically oriented members are tubes, each of said tubes having a plurality of holes formed therethrough to minimize buoyancy of the salt platform.

4. The salt platform of claim 1 wherein the plurality of vertically oriented members include a central vertically oriented member and six radial vertically oriented members positioned an equal radial distance from the central vertically oriented member.

5. The salt platform of claim 1 wherein plurality of the vertically oriented members are formed of PVC plastic pipe and the horizontal bracing members are formed of PVC plastic pipe.

6. The salt platform of claim 1, wherein the salt grid is formed of ABS plastic and has a plurality of holes formed therethrough, the plurality of holes being approximately ⅛ to ½ inch in diameter.

7. A salt platform for supporting a load of salt in a water softener brine tank, comprising:
a center vertically oriented member formed of a section of PVC pipe;
a plurality of radial vertically oriented members, each formed of a section of PVC pipe and positioned radially relative the elongated axis of the center vertically oriented member; and
at least one horizontal bracing member formed of a section of PVC pipe interconnecting the center vertically oriented member with each of the radial vertically oriented members to define a stable platform to support salt thereon within the water softener brine tank; a salt grid supported on the vertically oriented members, salt being supported on the salt grid.

8. The salt platform of claim 7 wherein each of the vertically oriented members have a plurality of open holes formed therethrough to minimize buoyancy of the salt platform.

9. The salt platform of claim 7 wherein the plurality of radial vertically oriented members comprises six members.

10. The salt platform of claim 7 further comprising a plurality of radial vertically oriented second members, each formed of a section of PVC pipe and positioned radially relative the elongated axis of the center vertically oriented member and radially outward of said plurality of radial vertically oriented members;
a pair of horizontal bracing members, each formed of a section of PVC pipe, interconnecting adjacent radial vertically oriented members with each of said radial vertically oriented second members.

11. The salt platform of claim 7 further comprising a plurality of radial vertically oriented second members, each formed of a section of PVC pipe and positioned radially relative the elongated axis of the center vertically oriented member, each of said radial vertically oriented second members positioned radially outward from a radial vertically oriented member along a radius centered at the elongate axis of the center vertically oriented member;
at least one horizontal radial bracing member formed of a section of PVC pipe interconnecting each of the radial vertically oriented second members to the radial vertically oriented members positioned along the radius from the elongated axis of the center vertically oriented member; and
a plurality of horizontal circumferential bracing members formed of a section of PVC pipe interconnecting adjacent radial vertically oriented second members.

12. A method of installing a salt platform for supporting a load of salt in a water softener brine tank, comprising the steps of:
positioning a center vertically oriented member in a vertical orientation;
positioning a plurality of radial vertically oriented members in a vertical orientation about the center vertically oriented member;
attaching at least one horizontal bracing member between each of the radial vertically oriented members and the center vertically oriented member supporting a salt grid on the vertically oriented members, the salt being supported on the salt grid; and
placing the vertically oriented members, horizontal bracing members and the salt grid within the water softener brine tank to support the salt in the water softener brine tank.

13. The method of claim 12 further comprising the steps of forming open holes through the vertically oriented members to minimize buoyancy of the salt platform.

14. The method of claim 12 further comprising the step of attaching the horizontal bracing members to the vertically oriented members by gluing the members.

15. A salt platform for supporting a load of salt in a water softener, comprising:
a plurality of vertically oriented sheets, each of said sheets having a plurality of apertures formed therethrough, defining surfaces, and upper edge;
a plurality of horizontal tubes, each of said tubes being inserted through an aperture in each of said sheets, each of said tubes having a pair of holes formed therethrough immediately adjacent the surfaces of each of the sheets where the tube passes through the sheets, the holes being on opposite sides of the sheets; and
a plurality of fasteners, a fastener being place in each of the holes in said plurality of tubes to space the sheets apart and to hold the platform together; a salt grid supported on the upper edges of the sheets, salt being supported on the salt grid.

16. The salt platform of claim 15 wherein the sheets are made of ABS plastic and the tubes are made of PVC pipe.

17. The salt platform of claim 15 wherein the fasteners are plastic wire ties.

18. The salt platform of claim 15 wherein the fasteners are bolts.

19. The salt platform of claim 15 wherein each of the sheets has four apertures formed therethrough, said plurality of tubes comprising four tubes.

* * * * *

UNITED STATES PATENT AND TRADEMARK OFFICE
CERTIFICATE OF CORRECTION

PATENT NO. : 5,411,717

DATED : May 2, 1995

INVENTOR(S) : Steven M. Peddicord and Donald B. Peddicord

It is certified that error appears in the above-indentified patent and that said Letters Patent is hereby corrected as shown below:

Col. 4, l. 25, after the word "members" insert --26 and 28--.

Col. 4, l. 37, after the word "grid" insert --34--.

Col. 5, l. 5, after the word "ders" insert --14-24--.

Col. 6, l. 52, after the word "wherein" insert --the--.

Col. 6, l. 53, delete the word "the".

Col. 6, l. 65, after the word "wherein" insert --the--.

Col. 6, l. 66, delete the word "the".

Col. 8, l. 32, after the word "and" insert --an--.

Signed and Sealed this

Twenty-sixth Day of March, 1996

Attest:

BRUCE LEHMAN

*Attesting Officer*     *Commissioner of Patents and Trademarks*